US006453800B1

(12) United States Patent
Chen

(10) Patent No.: US 6,453,800 B1
(45) Date of Patent: Sep. 24, 2002

(54) BREWING APPARATUS FOR ELECTRIC COFFEE MAKER

(75) Inventor: Chien-Chang Chen, Tainan (TW)

(73) Assignee: Tsann Kuen USA Inc., Pasadena, CA (US)

( * ) Notice: Subject to any disclaimer, the term of this patent is extended or adjusted under 35 U.S.C. 154(b) by 0 days.

(21) Appl. No.: 09/950,203

(22) Filed: Sep. 10, 2001

(51) Int. Cl.[7] ................................................ A47J 31/34
(52) U.S. Cl. .................................... 99/289 R; 99/302 P
(58) Field of Search ........................... 99/302 P, 302 R, 99/289 R, 295, 287

(56) References Cited

U.S. PATENT DOCUMENTS

| | | | | |
|---|---|---|---|---|
| 4,852,472 A | * | 8/1989 | In-Albon et al. | ...... 99/302 P X |
| 5,275,089 A | * | 1/1994 | Armellin | ............... 99/302 P X |
| 5,307,734 A | * | 5/1994 | Lussi et al. | ........... 99/289 R X |
| 6,116,147 A | * | 9/2000 | Schmed | ..................... 99/302 P |

* cited by examiner

Primary Examiner—Reginald L. Alexander
(74) Attorney, Agent, or Firm—Ladas & Parry

(57) ABSTRACT

A brewing apparatus for an electric coffee maker includes a sleeve unit and a plunger unit disposed horizontally and movably within a base. Firstly, when a large chamber is defined within the sleeve unit between the plunger unit and a water-feeding unit, ground coffee beans can be fed into the large chamber via an opening in the sleeve unit. Subsequently, when the sleeve unit and the plunger clamp the ground coffee beans, hot water can be fed into a small chamber defined within the sleeve unit between the plunger unit and the water-feeding unit, thereby resulting in consumed ground coffee and brewed coffee that exits from the plunger unit. Finally, when the sleeve unit is separated from the plunger unit, the consumed ground coffee drops from a space defined between the sleeve unit and the plunger unit.

6 Claims, 8 Drawing Sheets

BREWING APPARATUS FOR ELECTRIC COFFEE MAKER

BACKGROUND OF THE INVENTION

1. Field of the Invention

This invention relates to an electric coffee maker, and more particularly to a brewing apparatus for an electric coffee maker, which can receive and process ground coffee beans and hot water so as to discharge brewed coffee and consumed ground coffee therefrom.

2. Description of the Related Art

A conventional electric coffee maker that is found in coffee shops is generally provided with a brewing apparatus. When it is desired to brew coffee in the conventional electric coffee maker, a switch is actuated so as to feed automatically selected amounts of ground coffee beans and hot water into the brewing apparatus, thereby discharging brewed coffee from the coffee maker. However, because the brewing apparatus includes at least one vertically movable element, there is a need for providing numerous elements to cooperate with the movable element, thereby resulting in a complicated structure for the conventional coffee maker. Furthermore, it is difficult to remove consumed ground coffee from the conventional coffee maker.

SUMMARY OF THE INVENTION

An object of this invention is to provide a brewing apparatus for an electric coffee maker, which has a simple structure and which can remove automatically consumed ground coffee therefrom as soon as a brewing process is completed.

According to this invention, a brewing apparatus for an electric coffee maker includes a sleeve unit and a plunger unit disposed horizontally and movably within a base. Firstly, when a large chamber is defined within the sleeve unit between the plunger unit and a water-feeding unit, ground coffee beans can be fed into the large chamber via an opening in the sleeve unit. Subsequently, when the sleeve unit and the plunger clamp the ground coffee beans, hot water can be fed into a small chamber defined within the sleeve unit between the plunger unit and the water-feeding unit, thereby resulting in consumed ground coffee and brewed coffee that exits from the plunger unit. Finally, when the sleeve unit is separated from the plunger unit, the consumed ground coffee drops from a space defined between the sleeve unit and the plunger unit.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
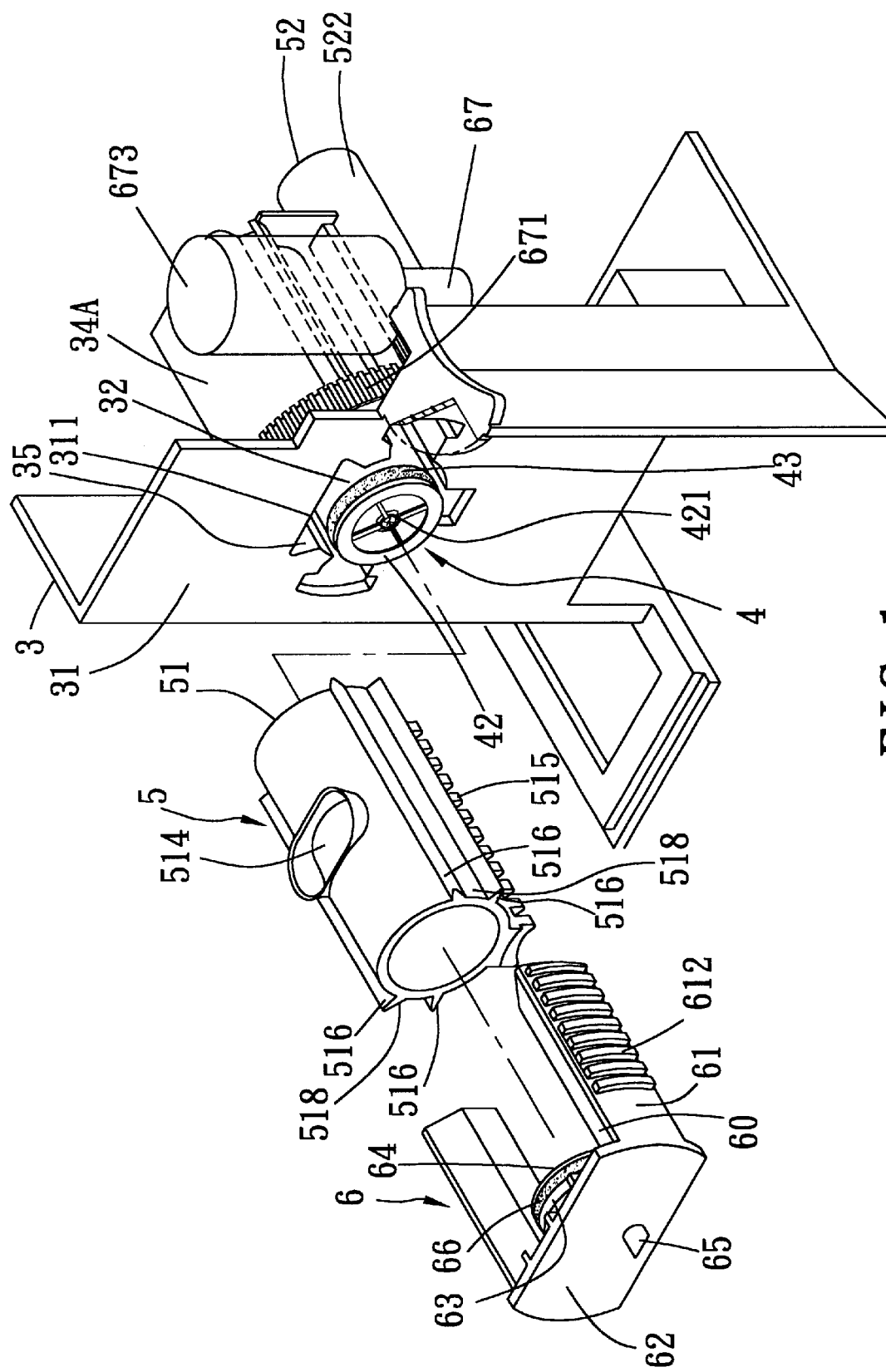
FIG. 1 is a partly exploded perspective view of the preferred embodiment of a brewing apparatus for an electric coffee maker according to this invention.
Figure 2:
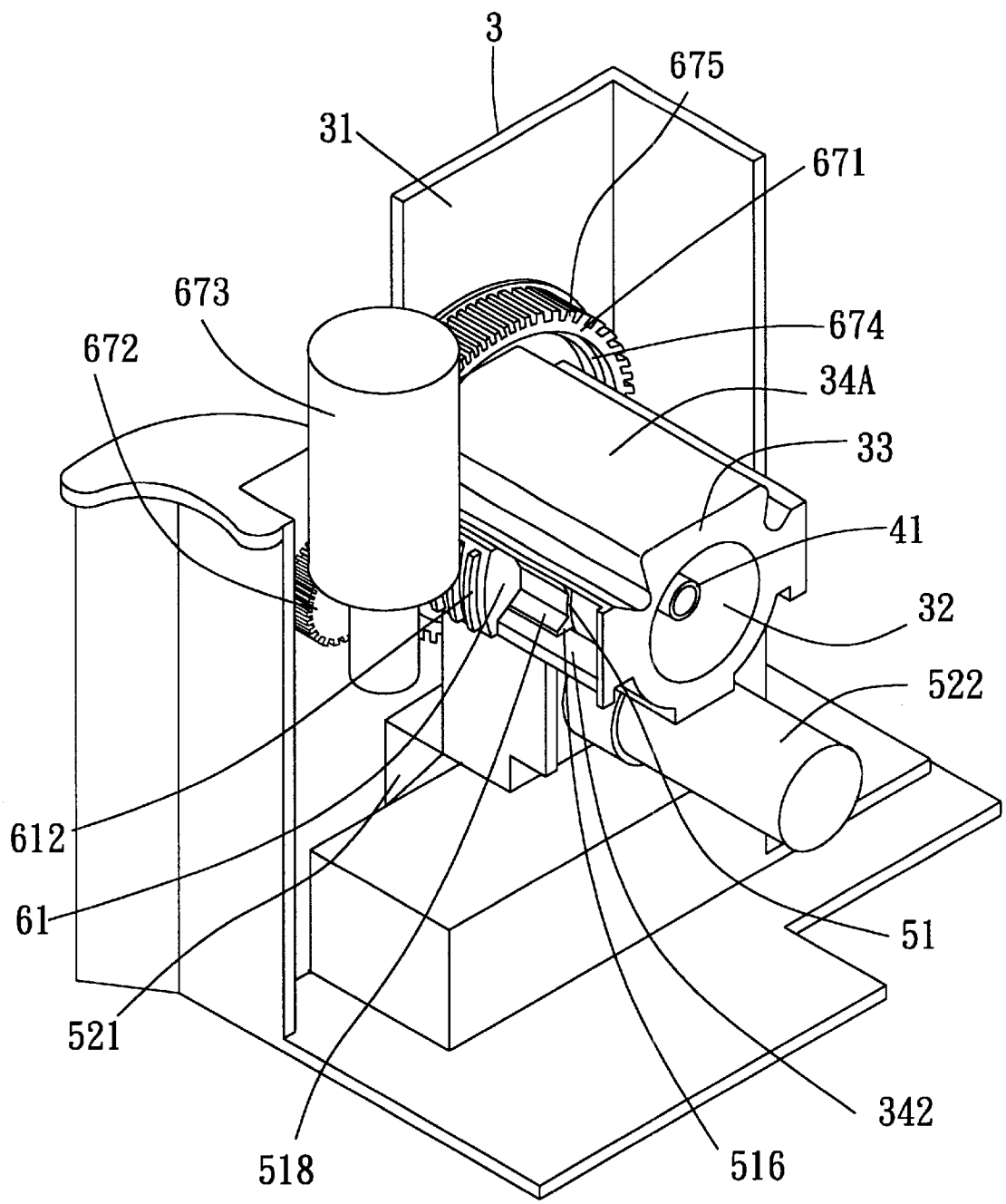
FIG. 2 is an assembled perspective view of the preferred embodiment.

Referring to FIG. 1, the preferred embodiment of a brewing apparatus for an electric coffee maker according to this invention is shown to include a machine base 3, a water-feeding unit 4, a sleeve unit 5 and a plunger unit 6.

Figure 3:
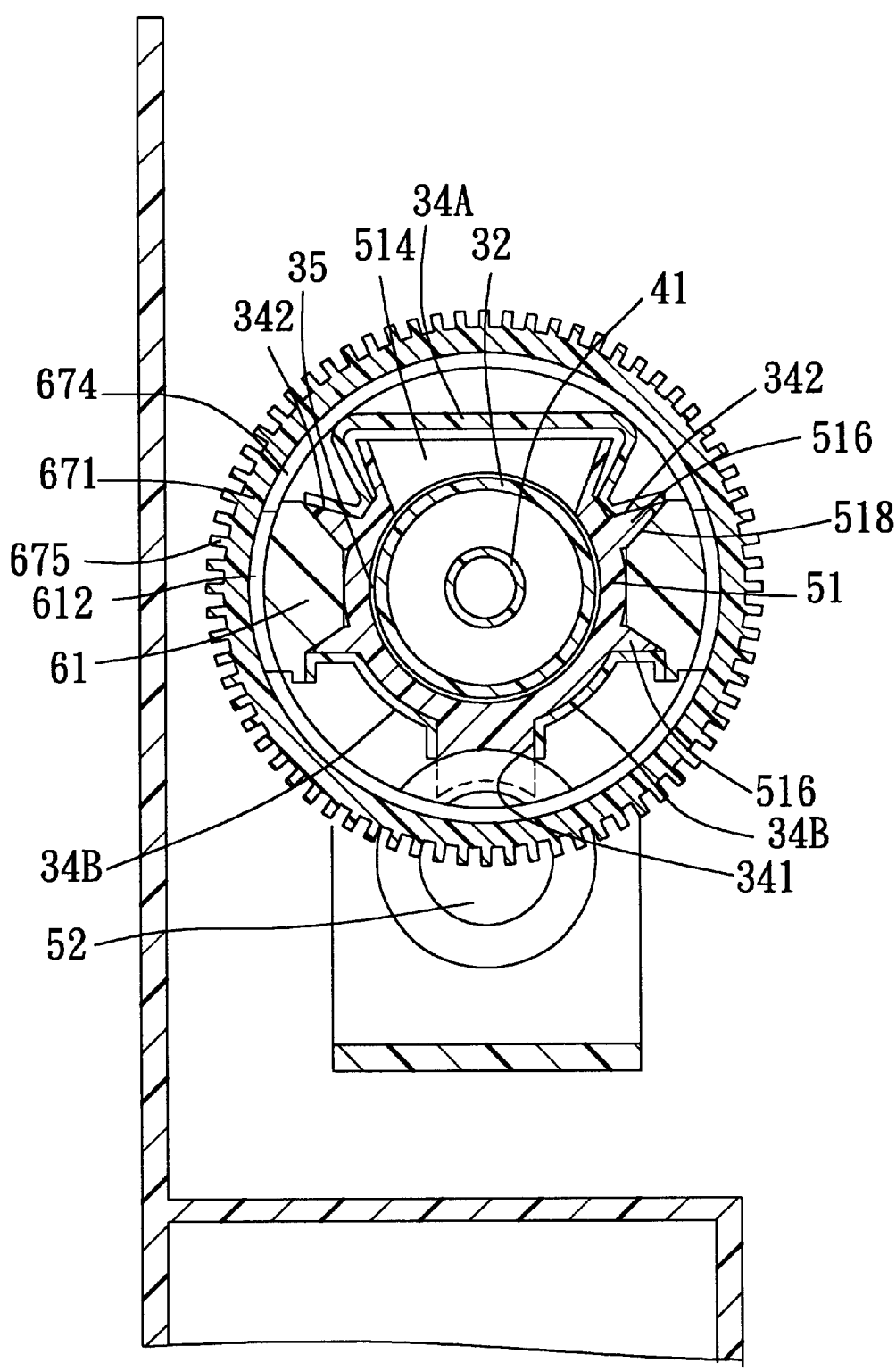
FIG. 3 is a sectional view of the preferred embodiment.

Referring to FIGS. 1, 2, 3 and 6, the machine base 3 has a vertical wall 31 with an opening 311, a horizontal guiding tube 32, a flange unit 33 that extends integrally, radially and outwardly from a rear end of the guiding tube 32, an upper connecting wall (34A) (see FIG. 3), and two lower connecting walls (34B) see FIG. 3). The guiding tube 32 has a central hole 321, which is formed through a front end wall 322 that is formed integrally with a rearwardly extending tubular portion 323. Each of the upper and lower connecting walls (34A, 34B) has a front end that is formed integrally with the vertical wall 31 and that is located around the opening 311, and a rear end that is formed integrally with the flange unit 33. A lower slot 341 (see FIG. 3) is defined between the lower connecting walls (34B). Each of a pair of side slots 342 (see FIG. 2) is defined between the upper connecting wall (34A) and a respective lower connecting wall (34B). A guideway 35 is defined between the guiding tube 32 and the assembly of the upper and lower connecting walls (34A, 34B).

Figure 6:
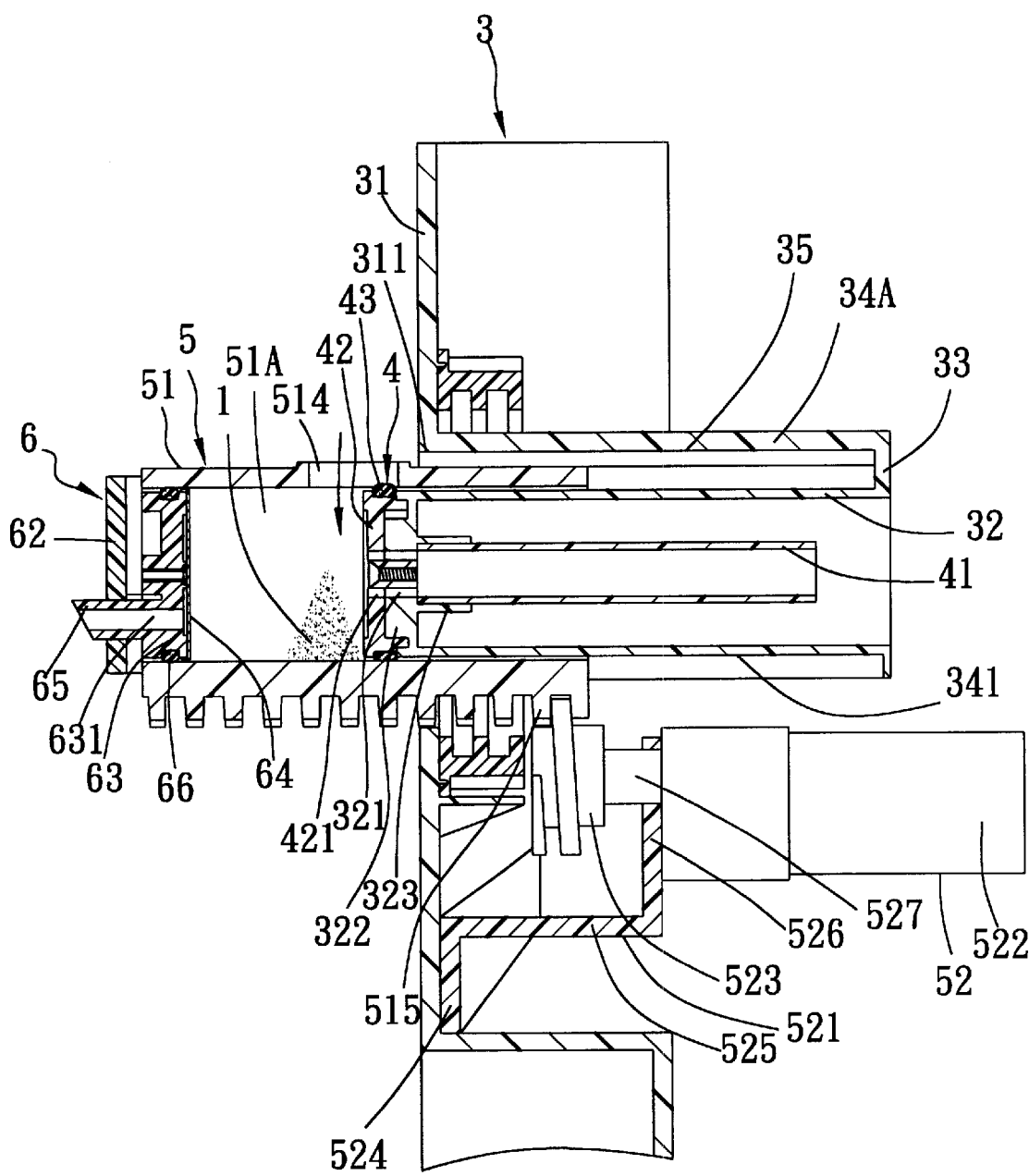
FIG. 6 is a sectional view of the preferred embodiment, illustrating how ground coffee beans are fed into a large chamber that is defined within the sleeve unit between a water-feeding unit and the plunger unit.

Referring to FIGS. 1 and 6, the water-feeding unit 4 includes a horizontal water conduit 41 for flow of hot water, a first clamping member 42 and an O-ring 43. The water conduit 41 has a front end that is press fitted within the tubular portion 323 of the guiding tube 32 and that is in fluid communication with the central hole 321 in the front end wall 322 of the guiding tube 32. The first clamping member 42 is generally shaped as a vertical circular plate, is fixed to the front end wall 322, and is formed with four hot-water outlets 421 that are in fluid communication with the central hole 321. The O-ring 43 is sleeved on the first clamping member 42.

Figure 4:
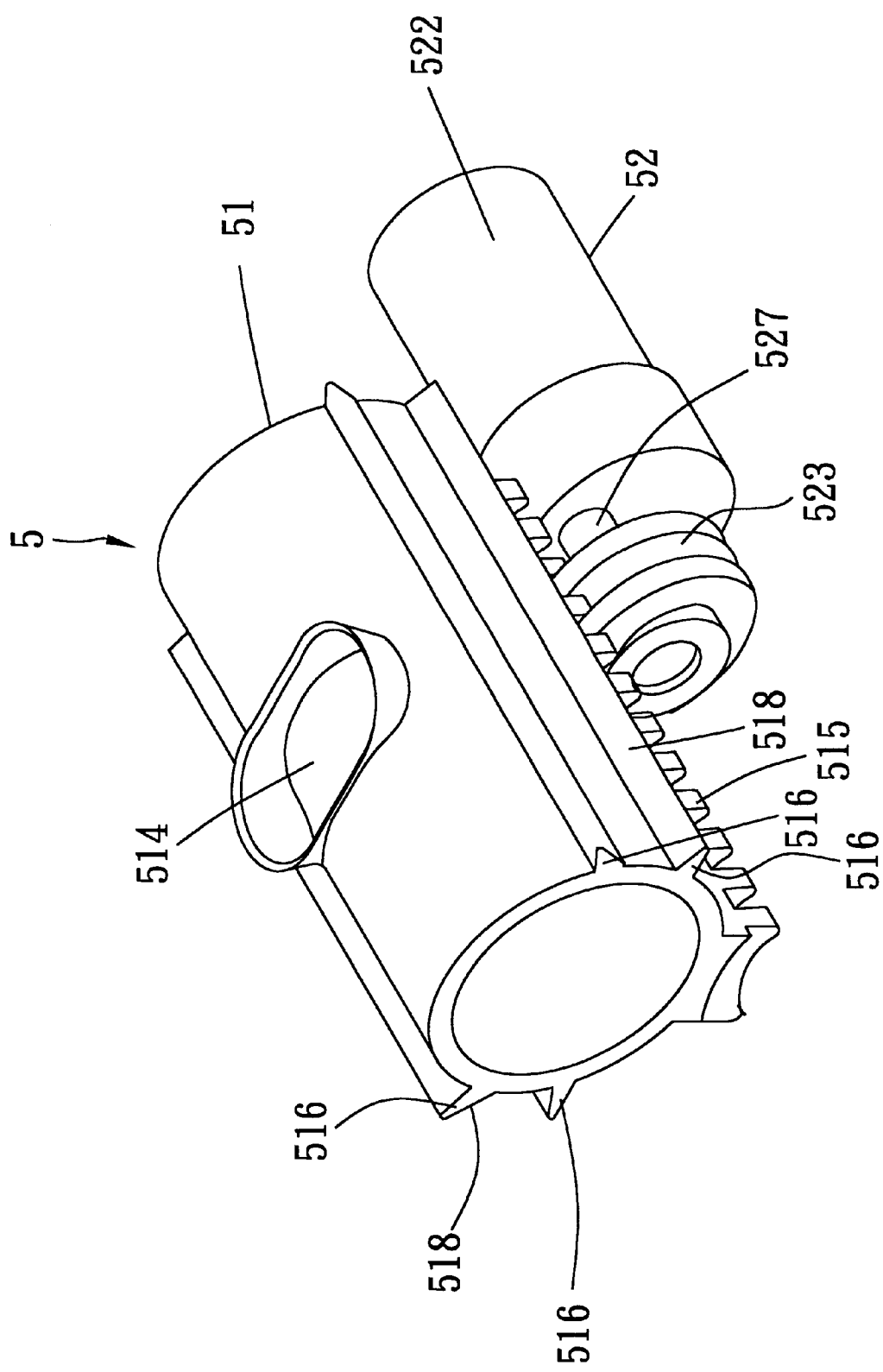
FIG. 4 is an assembled perspective view of a sleeve unit of the preferred embodiment.

Referring to FIGS. 3, 4 and 6, the sleeve unit 5 includes a sleeve body 51 that is disposed slidably within the guideway 35 in the machine base 3, and a sleeve driving mechanism 52. The sleeve body 51 has a top portion with a feeding opening 514, and a bottom portion with a fixed rack 515 that extends along a longitudinal direction of the sleeve body 51 and that projects through the lower slot 341 in the machine base 3, and two rib sets that are disposed on two opposite sides of the sleeve body 51. Each of the rib sets is disposed within the respective side slot 342 in the machine base 3, and includes two ribs 516, which extend integrally from the sleeve body 51 and which define a slide slot 518 therebetween that has a generally trapezoid cross-section and that extends in the longitudinal direction of the sleeve body 51. The sleeve driving mechanism 52 includes a supporting frame 521 that is fixed on the machine base 3, a first motor 522 that is disposed on the supporting frame 521, and a horizontal threaded rod 523 that is connected fixedly and coaxially to a motor shaft 527 of the first motor 522. Referring to FIG. 6, the supporting frame 521 has a vertical lower portion 524 that is bolted to and that is located behind the vertical wall 31 of the machine base 3, a horizontal portion 525 that extends integrally and rearward from an upper end of the vertical lower portion 524, and a vertical upper portion 526 that extends upward from a rear end of the horizontal portion 525. The motor shaft 527 extends through the vertical upper portion 526 of the supporting frame 521. The threaded rod 523 has an external thread portion that engages the rack 515 of the sleeve body 51. When the first motor 522 is actuated, the threaded rod 523 rotates so as to move the sleeve body 51 horizontally relative to the machine base 3.

Figure 5:
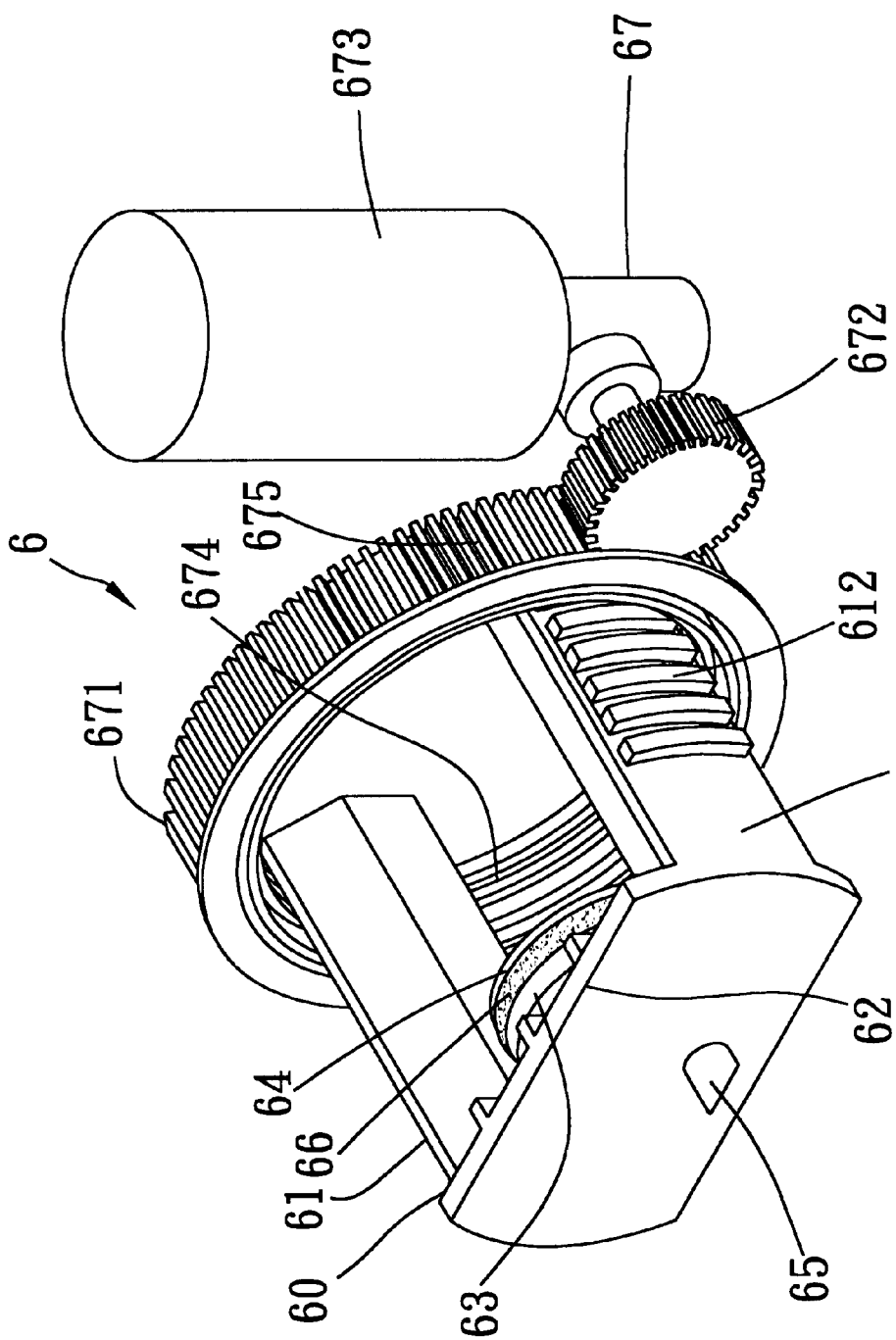
FIG. 5 is an assembled perspective view of a plunger unit of the preferred embodiment.

Referring to FIGS. 3, 5 and 6, the plunger unit 6 includes a U-shaped body 60 with two parallel arm portions 61 and a vertical plate portion 62, a plunger or second clamping member 63, a filter net 64, a horizontal discharge tube 65, an O-ring 66 and a plunger driving mechanism 67. The arm portions 61 extend integrally and rearwardly from two opposite sides of the vertical plate portion 61, and are received respectively, fittingly and slidably within the slide slots 518 in the sleeve body 51. The vertical plate portion 62 is disposed in front of the sleeve body 51. The second clamping member 63 is fixed to a rear side surface of the vertical plate portion 62, and has a horizontal coffee passage 631 formed therethrough. The filter net 64 is attached fixedly to a rear end surface of the second clamping member 63, and covers a rear end of the coffee passage 631. The discharge tube 65 is formed integrally with the second clamping member 63, and extends forward through the vertical plate portion 62. The coffee passage 631 is formed through the discharge tube 65. The O-ring 66 is sleeved on the second clamping member 63. The plunger driving mechanism 67 includes a large gear 671, a small gear 672 that has a diameter smaller than that of the large gear 671, and a second motor 673. The large and small gears 671, 672 are shaped as spur gears that can rotate about parallel horizontal axes, and are disposed rotatably on the machine base 3. The large gear 671 has an internal thread portion 674 that engages two horizontal rows of parallel teeth 612 on the arm portions 61 of the U-shaped body 60, and has an outer surface, which is formed with teeth 675 that mesh with those of the small gear 672. As such, when the second motor 673 is actuated, the small and large gears 672, 671 rotate, thereby moving the U-shaped body 60 horizontally relative to the machine base 3.

The first and second motors 522, 673 are connected operatively to and are controlled by a control unit (not shown). Accordingly, when a switch (not shown) is actuated, the sleeve unit 5 and the plunger unit 6 are moved automatically.

Referring to FIG. 6, the sleeve unit 5 and the plunger unit 6 are disposed at a first sleeve position and a first plunger position, respectively, in which rear and front ends of the sleeve body 51 are sleeved respectively on the first and second clamping members 42, 63. Under such condition, the O-ring 43 is disposed between the first clamping member 42 and the sleeve body 51, thereby establishing a liquid-tight seal therebetween. Likewise, the O-ring 66 is disposed between the second clamping member 63 and the sleeve body 51, thereby establishing a liquid-tight seal therebetween. A large chamber (51A) is defined within the sleeve body 51 between the first and second clamping members 42, 63. Ground coffee beans 1 can be fed into the large chamber (51A) via the opening 514 in the sleeve body 51, under the control of the control unit (not shown).

Figure 7:
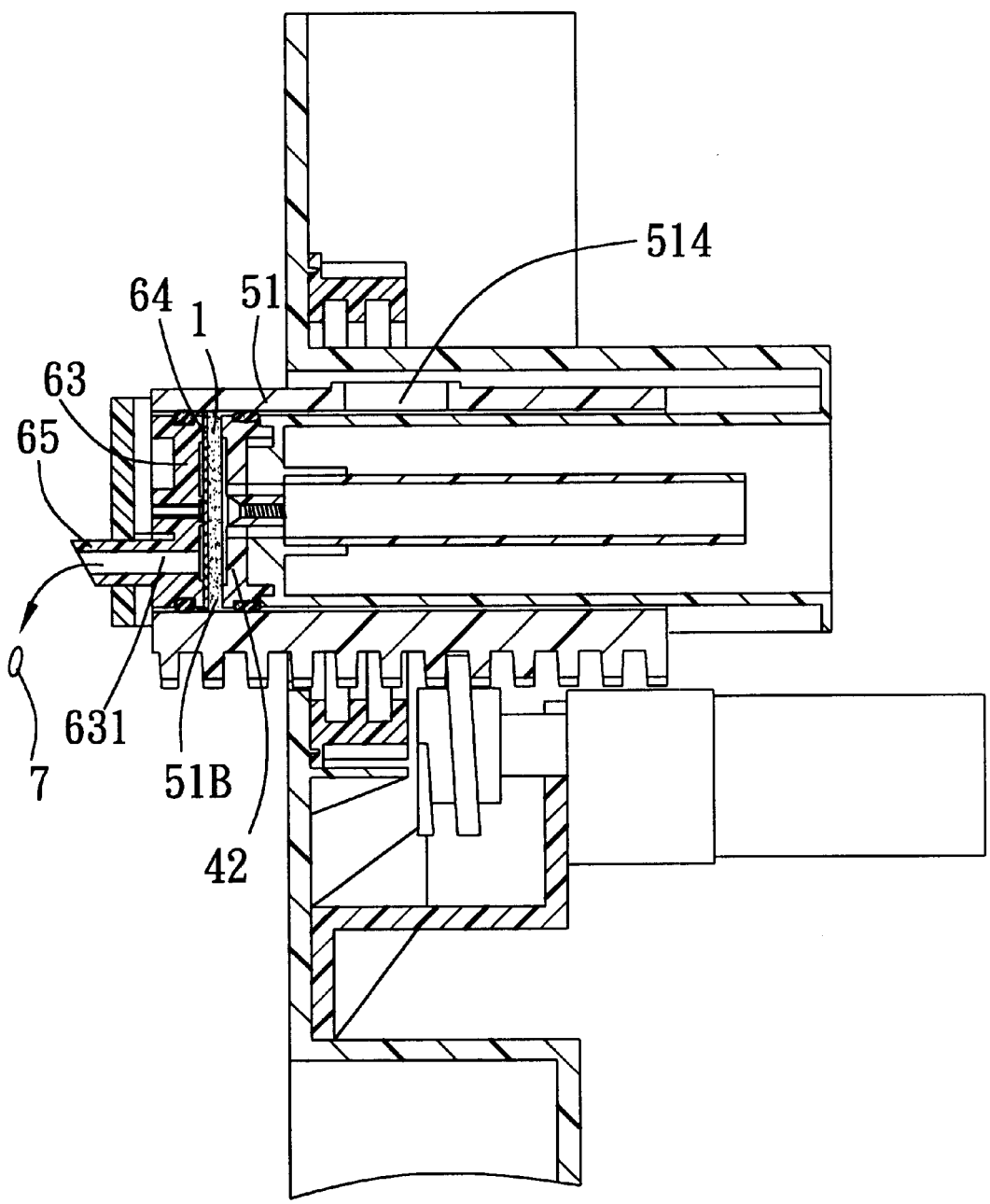
FIG. 7 is a sectional view of the preferred embodiment, illustrating how the ground coffee beans are compressed within a small chamber that is defined within the sleeve unit between the water-feeding unit and the plunger unit, how hot water is fed into the small chamber, and how brewed coffee is discharged from the small chamber.

Referring to FIG. 7, under the control of the control unit (not shown), the sleeve unit 5 and the plunger unit 6 are moved synchronously to a second sleeve position and a second plunger position, respectively, so that the second clamping member 63 presses the ground coffee beans 1 against the first clamping member 42. As such, a small chamber (51B) is defined within the sleeve body 51 between the first and second clamping members 42, 63, and is smaller than the large chamber (51A) in volume. The opening 514 in the sleeve body 51 is located behind the first clamping member 42, and is isolated fluidly from the small chamber (51B). When the ground coffee beans 1 are compressed in the small chamber (51B), hot water is fed from the hot-water outlets 421 in the first clamping member 42 into the small chamber (51B), thereby resulting in consumed ground coffee 8 (see FIG. 8) and brewed coffee 7 that exits from the plunger unit 6 via the discharge tube 65.

Figure 8:
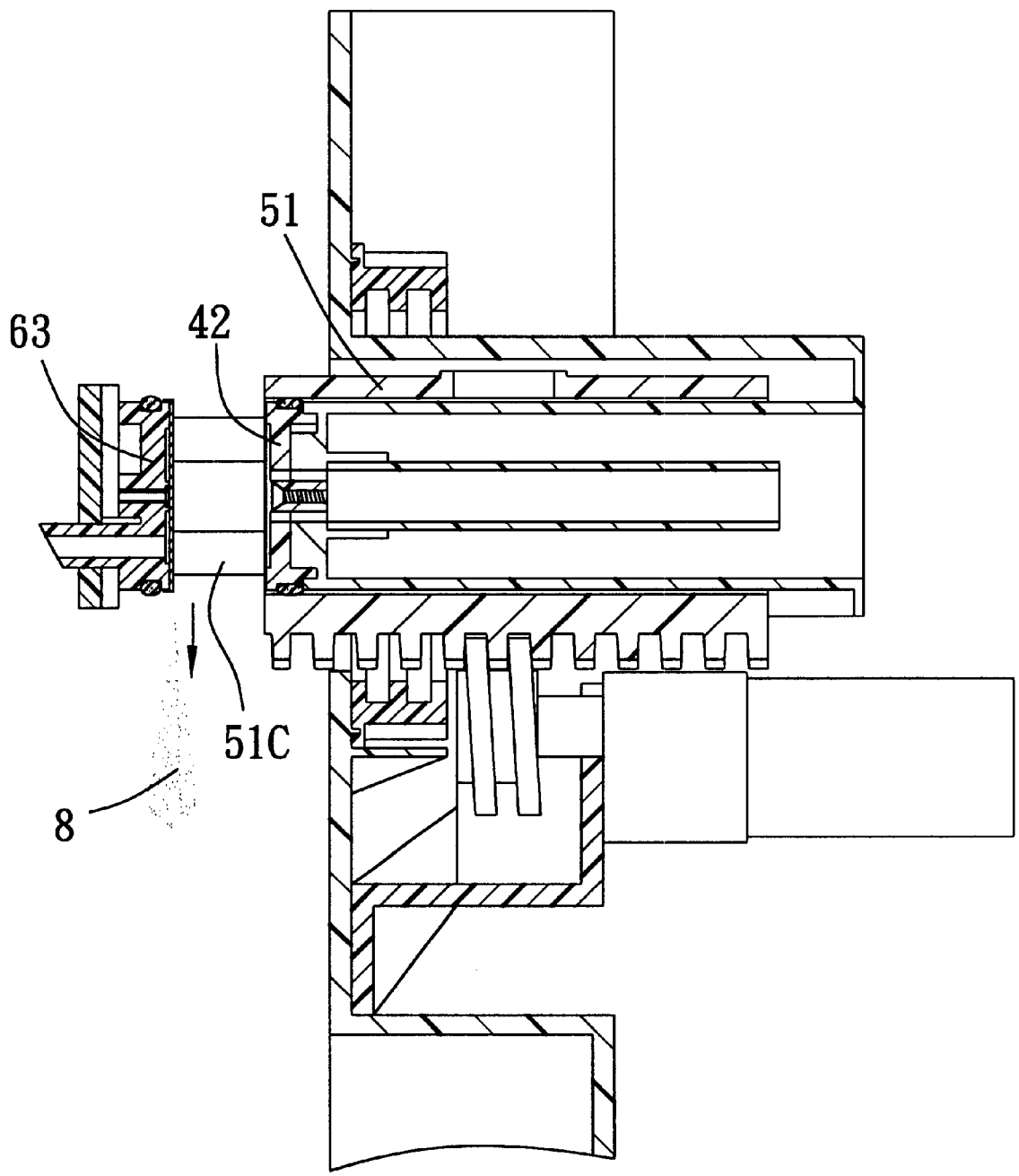
FIG. 8 is a sectional view of the preferred embodiment, illustrating how consumed ground coffee is discharged from a space that is defined between the plunger unit and the assembly of the sleeve unit and the water-feeding unit.

Referring to FIG. 8, under the control of the control unit (not shown), the front end of the sleeve body 51 separates rearward from the second clamping member 63, and is subsequently sleeved on the first clamping member 42. As such, the consumed ground coffee 8 drops automatically from a space (51C) that is defined between the second clamping member 63 and the assembly of the sleeve body 51 and the first clamping member 42.

With this invention thus explained, it is apparent that numerous modifications and variations can be made without departing from the scope and spirit of this invention. It is therefore intended that this invention be limited only as indicated by the appended claims.

I claim:

1. A brewing apparatus for an electric coffee maker, said brewing apparatus comprising:

a machine base with a fixed horizontal guiding tube that has a front end and a rear end;

a water-feeding unit disposed fixedly on said front end of said guiding tube and including a first clamping member that is fixed relative to said machine base, and a hot-water outlet that is formed in said first clamping member;

a sleeve unit including a sleeve body that is sleeved movably on said guiding tube and that has a top portion with a feeding opening, and a sleeve driving mechanism for driving said sleeve body to move horizontally on said guiding tube among a first sleeve position, a second sleeve position and a third sleeve position; and a plunger unit including a second clamping member that is disposed horizontally and movably relative to said machine base and said sleeve body and that is located in front of said first clamping member, a coffee passage that is formed through said second clamping member and that is adapted to discharge brewed coffee via said coffee passage, and a plunger driving mechanism for driving said plunger unit to move horizontally on said machine base among a first plunger position, where said sleeve unit is disposed at said first sleeve position so that said sleeve body is sleeved on said first and second clamping members such that a large chamber is defined within said sleeve unit between said first and second clamping members and is in communication with said opening, thereby permitting feeding of ground coffee beans into said large chamber via said opening, a second plunger position, where said sleeve unit is disposed at said second sleeve position so that the ground coffee beans are compressed within a small chamber, which is defined within said sleeve unit between said first and second clamping members, which is smaller than said large chamber in volume, and which is isolated fluidly from said opening, thereby permitting feeding of hot water from said hot-water outlet into said small chamber so as to result in consumed ground coffee and the brewed coffee that exits from said plunger unit via said coffee passage, and a third plunger position, where said sleeve unit is disposed at said third sleeve position so that said sleeve body is spaced apart from said second clamping member, thereby defining a space between said second clamping member and assembly of said first clamping member and said sleeve body, from which the consumed ground coffee drops automatically.

2. The brewing apparatus as claimed in claim 1, wherein said sleeve body has a bottom portion, said sleeve unit further including a rack that is attached fixedly to said bottom portion and that extends in a longitudinal direction of said sleeve body, said sleeve driving mechanism including:
- a threaded rod having an external thread portion that engages said rack; and
- a first motor disposed on said machine base and having a horizontal motor shaft that is connected fixedly and coaxially to said threaded rod so as to rotate said threaded rod.

3. The brewing apparatus as claimed in claim 1, wherein said plunger unit further includes a U-shaped body, which has a vertical plate portion and two arm portions that extend integrally, horizontally and rearwardly from two opposite sides of said vertical plate portion, said vertical plate portion having a rear side surface, to which said second clamping member is attached fixedly, each of said arm portions being provided with a horizontal row of parallel teeth, said plunger driving mechanism including:
- a large gear disposed rotatably on said machine base and rotatable about a horizontal axis, said large gear being formed with an internal thread portion that engages said teeth of said arm portions;
- a small gear disposed rotatably on said machine base and meshing with said large gear and having a diameter that is smaller than that of said large gear; and
- a second motor disposed on said machine base and connected operatively to said small gear so as to rotate said small and large gears, thereby moving said arm portions horizontally relative to said machine base.

4. The brewing apparatus as claimed in claim 3, wherein said second clamping member has a rear end surface, said coffee passage having a rear end that is formed in said rear end surface of said second clamping member, said plunger unit further including a filter net that is attached fixedly to said rear end surface of said second clamping member and that covers said rear end of said coffee passage.

5. The brewing apparatus as claimed in claim 3, wherein said second clamping member is formed integrally with a horizontal discharge tube that extends forward through said vertical plate portion of said U-shaped body, said coffee passage being formed through said discharge tube.

6. The brewing apparatus as claimed in claim 3, wherein said sleeve body is formed with two rib sets on two opposite sides thereof, each of said rib sets including two ribs, which define a slide slot therebetween that has a generally trapezoid cross-section and that extends ina longitudinal direction of said sleeve body, said arm portions being received respectively, fittingly and slidably within said slide slots.

* * * * *